United States Patent
Ceshkovsky

(10) Patent No.: US 6,744,711 B1
(45) Date of Patent: Jun. 1, 2004

(54) METHOD AND APPARATUS FOR A HIGH-SPEED SEARCH OF AN OPTICAL MEDIUM

(75) Inventor: Ludwig Ceshkovsky, Irvine, CA (US)

(73) Assignee: Discovision Associates, Irvine, CA (US)

( * ) Notice: Subject to any disclaimer, the term of this patent is extended or adjusted under 35 U.S.C. 154(b) by 875 days.

(21) Appl. No.: 09/597,941

(22) Filed: Jun. 20, 2000

(51) Int. Cl.[7] ................................................ G11B 7/00
(52) U.S. Cl. .................................. 369/44.28; 369/44.29
(58) Field of Search ........................... 369/44.25, 44.29, 369/44.35, 44.28, 44.34, 53.28, 44.26, 109.01, 275.3, 13.02, 116, 53.26, 13.26, 13.11, 13.22, 13.17, 44.11, 53.3, 44.27, 30.16, 30.13, 30.17

(56) References Cited

U.S. PATENT DOCUMENTS

| | | | |
|---|---|---|---|
| 4,138,663 A | 2/1979 | Lehureau et al. | 340/146.3 |
| 4,607,358 A | 8/1986 | Maeda et al. | 369/44 |
| 4,660,191 A | 4/1987 | Maeda et al. | 369/46 |
| 4,677,602 A | 6/1987 | Okano et al. | 369/32 |
| 4,779,253 A | 10/1988 | Gertreuer et al. | 369/44 |
| 4,797,866 A | 1/1989 | Yoshikawa | 369/43 |
| 4,901,299 A | 2/1990 | Nakatsu | 369/32 |
| 4,974,220 A | 11/1990 | Harada | 369/44.26 |
| 4,980,876 A | 12/1990 | Abate et al. | 369/44.11 |
| 5,033,041 A | 7/1991 | Schröder | 369/44.32 |
| 5,038,333 A * | 8/1991 | Chow et al. | 369/44.28 |
| 5,072,434 A | 12/1991 | Uchikoshi et al. | 369/44.28 |
| 5,179,545 A | 1/1993 | Tanaka et al. | 369/32 |
| 5,210,726 A | 5/1993 | Jackson et al. | 369/32 |
| 5,381,399 A | 1/1995 | Uehara | 369/215 |
| 5,394,386 A | 2/1995 | Park et al. | 369/44.28 |
| 5,459,705 A | 10/1995 | Matoba et al. | 369/44.34 |
| 5,504,725 A | 4/1996 | Katsumata | 369/44.28 |
| 5,610,884 A | 3/1997 | Yanagidate | 369/44.28 |
| 5,638,350 A | 6/1997 | Fuji | 369/44.37 |
| 5,689,485 A | 11/1997 | Ceshkovsky | 369/44.13 |
| 5,881,036 A | 3/1999 | Ceshkovsky | 369/44.28 |
| 5,978,331 A | 11/1999 | Ceshkovsky | 369/44.29 |
| 6,134,199 A * | 10/2000 | Ceshkovsky | 369/44.35 |
| 6,314,069 B1 * | 11/2001 | Ceshkovsky | 369/44.35 |

OTHER PUBLICATIONS

Eisen, Alexander. "Rotary Encoder for Servo–Loop Apps." Electronic Design, Sep. 16, 1996, P 99.

* cited by examiner

*Primary Examiner*—Ali Neyzari
(74) *Attorney, Agent, or Firm*—Keiji Masaki; Steve A. Wong; Richard J. Stokey

(57) ABSTRACT

An apparatus and method conducts a high-speed search on an optical medium having a plurality of tracks on which information is recorded. At least a first light spot and a second light spot are directed by the apparatus onto the optical medium. The light spots traverse across the tracks in one of a first direction and a second direction. A photodetector unit receives a reflected component of the first light spot to form a first electrical signal and a reflected component of the second light spot to form a second electrical signal. Digital shaping circuitry respectively converts the first electrical signal and the second electrical signal into a first digital signal and a second digital signal. A quadrature detector is configured to receive the first digital signal and the second digital signal. The first digital signal and the second digital signal are arranged in a quadrature relationship to each other. The quadrature detector produces from the first digital signal and the second digital signal an up-count signal indicating that the light spots are traversing the tracks in the first direction and a down-count signal indicating that the light spots are traversing the tracks in the second direction. A counter counts, during the search, the up-count signal and the down-count signal to determine a number of tracks traversed by the light spots.

28 Claims, 9 Drawing Sheets

THREE BEAMS USED FOR TRACKING

METHOD AND APPARATUS FOR A HIGH-SPEED SEARCH OF AN OPTICAL MEDIUM

FIELD OF THE INVENTION

This invention relates generally to a system for recording and/or reproducing digital information on an optical medium, and, more particularly, to a system which performs a high-speed search for the information stored on the optical medium.

BACKGROUND OF THE INVENTION

Information is generally stored by an optical disc in the form of concentric or spiral tracks sometimes referred to as information tracks. A recording and/or reproducing device rotates the optical disc while using a light beam to retrieve the information from or record the information to the optical disc. As the optical disc rotates, the light beam radially traverses the optical disc while a tracking servo loop in the recording and/or reproducing device keeps the beam of light centered on the information track, or, alternately, the track will become the information track in the case of recording information to the optical disc.

A three-beam arrangement is one common arrangement used to supply tracking signals to a tracking servo loop, which is maintaining the light beam on the current track of the optical disc. In this arrangement, a laser beam passes through a diffraction grading to form a center beam and two secondary beams. The center beam is used to read or record information on the optical disc and the two secondary beams are used for tracking the current track on which the information is being read or recorded. The two secondary beams form two spots on opposite sides of a track offset with respect to each other. A photodetector array includes a main array of four photodetector sensing the reflection of the center beam and two individual photodetectors, commonly referred to as the E and F photodetectors, sensing light from the two side beams reflected off of the optical disc.

A "search" or "seek" operation is a common operation of a recording and/or reproducing device the purpose of which is to move the light beams from the current track, i.e., the track wherein the light beam is presently positioned, to a target track. During the "search" operation, the recording and/or reproducing device typically searches for the target track on the optical disc. Achieving a search operation may require the light beams to radially move across several information tracks starting from the current track before the target track is found. Once the target address is found, the optical disc storage device can return to its normal mode of retrieving or recording information.

One method of search is to estimate based on the starting location of the light beam and the physical parameters of the movement system (e.g., mass of a carriage drive, velocity of movement of an optical head), where the target track might be located, and to then initiate commands to move the optical head which controls the light beams toward this target track. The optical head is then moved to the estimated track. The estimated track is read to determine if the track has been reached. If the target track has been overshot or undershot a further estimate is made and the optical head is again moved in a direction toward the target track. These steps are then repeated until the target track is reached. The disadvantage of this approach is that it is slow because each time a track is read a close loop tracking operation must be achieved.

Another method of search is to employ a counter that keeps an accumulated total of the number of tracks crossed as the optical head is moved radially across the disc. The optical head then moves towards the target track a number of tracks determined to be the absolute value of the starting track number subtracted from the target track number. This approach speeds up the search but it is only as effective as the accuracy of the track crossing counter. Previous counting devices have counted the total number of tracks traversed whether a track is traversed in a forward or backward direction. In the situation where an optical disc is subject to vibrations and acceleration forces, the optical head may move back and forward several times from the initial track to the destination track. Thus, the total number of tracks counted will be an overestimate of the actual number of tracks traversed. An additional source of error in the count may be introduced due to eccentricity of the optical disc. An inaccurate count track slows down the search, since if the target track has been overestimated or underestimated a new search must be initiated in order to move the optical head to the target track.

In order to solve the above problems, it is desirable to find an apparatus and method for counting tracks during a search, which is accurate even in the presence of vibration, acceleration forces, eccentricity, and other sources of error.

OBJECTS OF THE INVENTION

In view of the foregoing, an object of the present invention is to provide an optical information recording/reproducing apparatus that is capable of searching a target track with an enhanced reliability.

Accordingly, another object of the present invention is to provide an optical information recording/reproducing apparatus which is capable of searching a target track with an enhanced reliability and accuracy during a search regardless of the presence of vibrations or other acceleration forces acting on the recording/reproducing apparatus.

Accordingly, another object of the present invention is to provide an optical information recording/reproducing apparatus that is capable of a high-speed search.

It is another object of the present invention to provide a high-speed search having improved accuracy of track counting during the high-speed search.

It is yet another object of the present invention to provide a search apparatus and method with improved accuracy of track counting during a high-speed search by taking into account the direction of crossing of a track during the search.

It is still another object of the present invention to provide a search apparatus and method with improved accuracy of track counting during a high-speed search by counting the net track movement, rather than counting the total accumulated movement resulting from bidirectional track crossings.

It is yet another object of the present invention to provide a search apparatus and method with improved accuracy of track counting during a high-speed search by arranging the E and F beams of a three-beam tracking system in quadrature, to thus enable a high-speed search based on an accurate track count using simplified components.

It is still another object of the present invention to provide a high-speed search by using a plurality of rates of motion.

It is yet another object of the present invention to provide a high-speed search by using a plurality of rates of motion and choosing one of the rates of motion based on an improved track count of the present invention.

Further objects and advantages of the present invention will become apparent from a consideration of the drawings and ensuing description.

SUMMARY OF THE INVENTION

In order to achieve the above-mentioned objectives, the present invention conducts a high-speed search on an optical medium having a plurality of tracks on which information is recorded. At least a first light spot and a second light spot are directed by an optical system onto the optical medium. The light spots traverse across the tracks in one of a first direction and a second direction. A photodetector unit receives a reflected component of the first light spot and a reflected component of the second light spot to form, respectively, a first electrical signal and a second electrical signal. Digital shaping circuitry respectively converts the first electrical signal and the second electrical signal into a first digital signal and a second digital signal. A quadrature detector receives the first digital signal and the second digital signal to produce from the first digital signal and the second digital signal an up-count signal indicating that the light spots are traversing the tracks in the first direction and a down-count signal indicating that the light spots are traversing the tracks in the second direction.

According to another aspect of the present invention, a counter counts, during the search, the up-count signal and the down-count signal to determine a number of tracks traversed by the light spots.

In yet another aspect of the present invention, a microcomputer is coupled to the quadrature detector and is configured to count, during the search, the up-count signal and the down-count signal to identify a number of tracks traversed by the light spots.

In an additional aspect of the present invention, the first light spot and the second light spot are arranged on the tracks in a quadrature relationship to each other. In an additional embodiment of the present invention, the first electrical signal and the second electrical signal are arranged on the tracks in a quadrature relationship to each other. In another embodiment of the present invention, the first digital signal and the second digital signal are arranged in a quadrature relationship to each other.

In a further aspect of the present invention, the quadrature relationship is characterized by about a 90-degree shift between the first digital signal and the second digital signal.

In accordance with yet another aspect of the present invention, the quadrature relationship is characterized by a tolerance relationship between the first digital signal and the second digital signal. The tolerance relationship is determined so that the first digital signal and the second digital signal vary within a specified number of degrees of 90 degrees as permitted by a tolerance parameter of the quadrature detector.

In still another aspect of the present invention, the quadrature relationship is characterized by the first digital signal leading the second digital signal in time.

In yet another aspect of the present invention, the quadrature relationship is characterized by the second digital signal leading the first digital signal in time.

In accordance with another aspect of the present invention, a light source creates a light beam. A diffraction grating splits the light beam into at least at least a first light beam and a second light beam causing, respectively, the first light spot and the second light spot. Typically, the quadrature relationship is produced by adjusting the diffraction grating.

In still another aspect of the present invention, the photodetector unit forms a three-beam system comprising a first photodetector receiving the first light spot and a second photodetector receiving the second light spot.

In yet another aspect of the present invention, the photodetector unit forms a three-beam system and a first photodetector receives the first electrical signal being an E signal of the three-beam system and a second photodetector receives the second electrical signal being an F signal of the three-beam system.

In a further aspect of the present invention, a carriage moves a portion of the optical system across the optical medium. The carriage moves the optical system using one or more rates of motion. Each of the one or more rates of motion is determined to operate within an interval defining a distance between tracks of the optical medium. A first distance is computed to be a difference between a current track over which the optical system is presently positioned and a target track. The current track is determined from the up-count signal and the down-count signal. The optical system is moved at the rate of motion corresponding to the interval in which the first distance falls.

In an additional aspect of the present invention, the quadrature detector further comprises a first flip-flop having a clock input and a Q output. The first digital signal is coupled to the clock input of the first flip-flop. The up-count signal is coupled to the Q output of the first flip-flop. A second flip-flop has a clock input and a Q output. The second digital signal is coupled to the clock input of the second flip-flop. The up-count signal is coupled to the Q output of the second flip-flop.

In yet another aspect of the present invention, the digital shaping circuitry comprises a first Schmitt-trigger which converts the first electrical signal into the first digital signal and a second Schmitt-trigger which converts the second electrical signal into the second digital signal.

In still another aspect of the present invention, the optical system comprises an objective lens which directs the first light spot and the second light spot onto the optical medium.

In one embodiment of the present invention, a method conducts a high-speed search by adjusting at least a first light spot and a second light spot to form a quadrature relationship to each other. The first and second light spots are then directed onto an optical medium. The light spots traverse across tracks of the optical medium in one of an inward direction and an outward direction. A reflected component of the first light spot is received to form a first electrical signal and a reflected component of the second light spot is received to form a second electrical signal. The first electrical signal and the second electrical signal are shaped into a first digital signal and a second digital signal. From the quadrature relationship of the first digital signal and the second digital signal, an up-count signal indicating that the light spots are traversing the tracks in the first direction and a down-count signal indicating that the light spots are traversing the tracks in the second direction are determined.

In a further aspect of the present invention, the up-count signal and the down-count signal are counted to estimate a number of tracks traversed by the light spots.

In still another aspect of the present invention, a counter, having sufficient memory to record a maximum number of tracks traversed, receives the up-count signal and the down-count signals and generates the estimate of the number of tracks traversed.

In yet another aspect of the present invention, a microcomputer receives the up-count signal and the down-count signals and generates the estimate of the number of tracks traversed.

In another aspect of the present invention, the first light spot and the second light spot are moved at one of three rates of movement. One of the three rates of movement is selected based on a distance between a current track and a target track wherein the current track is estimated by the counting step.

In still another aspect of the present invention, a distance between a current track over which an optical system is presently positioned and a target track is determined. The optical system is configured to position the first and the second light spots on the optical medium. The optical system is moved at a high rate of movement if the distance is greater than a significant distance. The optical system is moved at a medium rate of movement if the distance is greater than a nominal distance but less than the significant distance. The medium rate of movement is less than the high rate of movement. The nominal distance is less than the significant distance. The optical system is moved at a low rate of movement if the distance is less than the nominal distance but greater than a minimal distance. The low rate of movement is less than the medium rate of movement and the minimal distance being less than the nominal distance. The number of tracks crossed is counted, based on the up-count signal and the down-count signal, while the optical system is moving according to one of the above moving steps, to determine the current track.

In yet another aspect of the present invention, a method determines a distance between a current track over which an optical system is presently positioned and a target track. The optical system is configured to position the first and the second light spots on the optical medium. A plurality of rates of motion is then determined for moving the optical system. A plurality of disjoint intervals defining a number of tracks to be crossed is determined. Each one of the plurality of rates of motion corresponds to one of the disjoint intervals. The optical system moves at one of the rates of motion if the distance falls within the corresponding interval. The number of tracks crossed is counted to determine the current track, based on the up-count signal and the down-count signal, while the optical system is moving according to one of the above moving steps.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
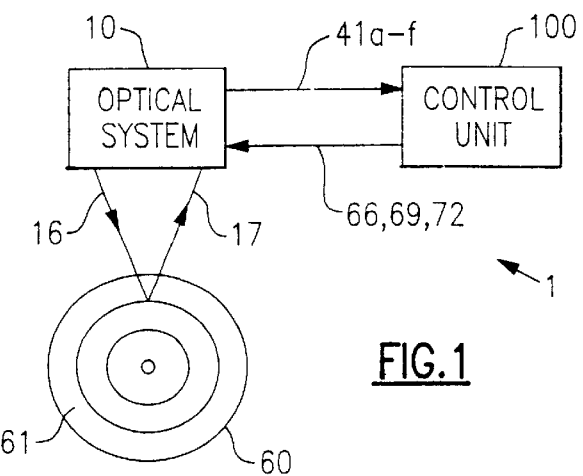
FIG. 1 is a simplified schematic of a recording/reproducing apparatus for recording to and/or reproducing from an optical medium.

Referring to FIG. 1, there is shown a simplified schematic of a recording/reproducing apparatus 1 for recording to and/or reproducing from an information media such as videodiscs, magneto-optical discs, audio discs, and computer data discs, collectively referred to herein as an "optical disc". Although the following embodiment is described as acting on an optical disc, modifications of the embodiment may also act on other forms of optical media, such as optical tape.

The recording/reproducing apparatus 1 comprises an optical system 10, alternately known in the art as an optical head, for focusing a read/record beam 16 onto and receiving a reflected read/record beam 17 from an information-bearing surface 61 of an optical disc 60. In various embodiments of the recording/reproducing apparatus 1, the read/record beams 16 and the reflected read/record beam 17 may be configured to read, record, or to both read and record information to or from the information-bearing surface 61 of the optical disc 60. The recording/reproducing apparatus 1 further comprises a control unit 100 for moving the read/record beam 16 with respect to the information-bearing surface 61 using the control signals 66, 69, and 72. The control unit 100 receives feedback in the form of tracking and focusing information from electrical signals 41a–f which are received from the optical system 10, as will be further described below.

Figure 2:
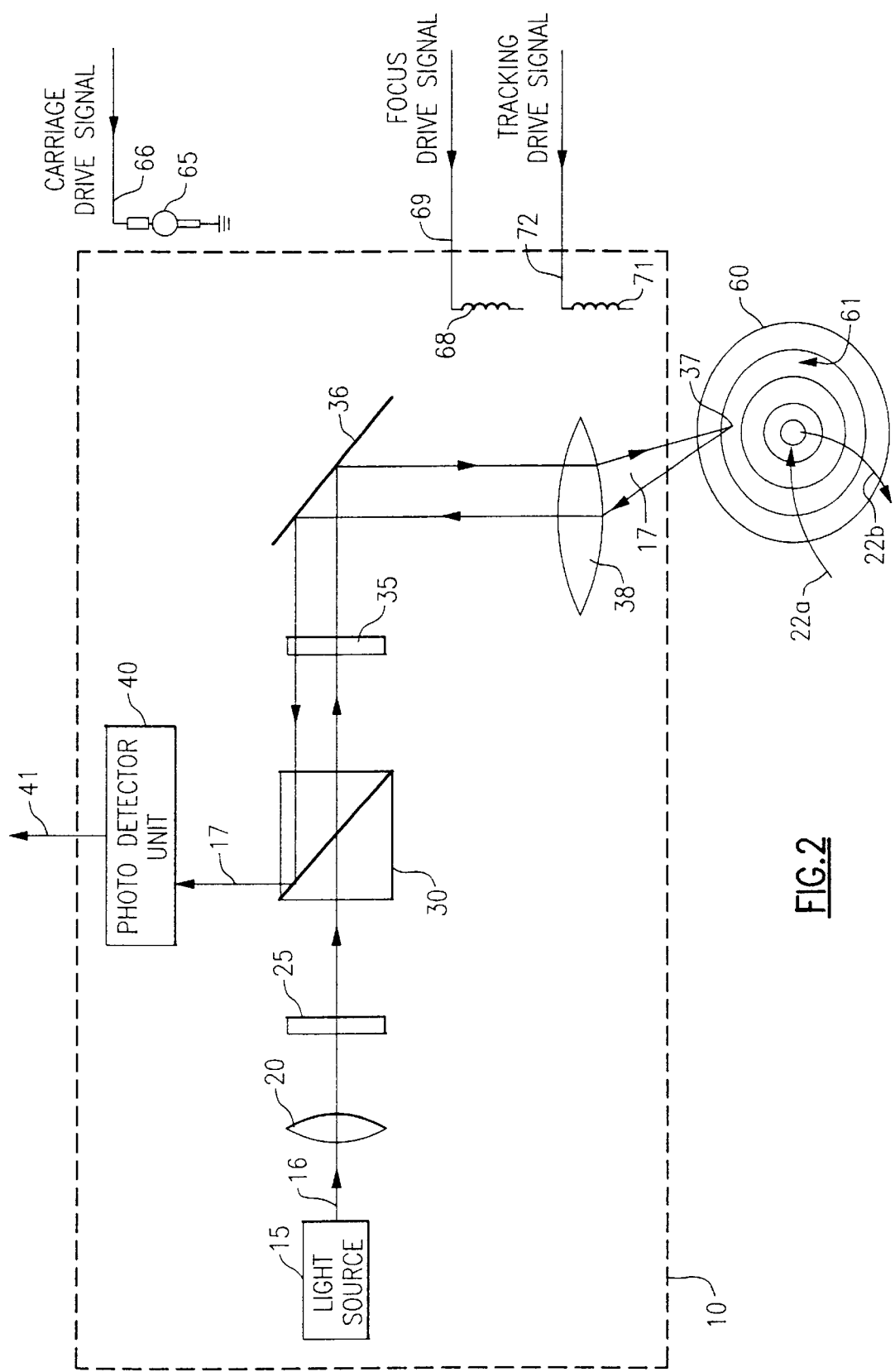
FIG. 2 is a block diagram showing optical elements of the recording/reproduction apparatus according to the present invention.

Referring to FIG. 2, there is shown the optical system 10 including a light source 15, preferably a laser, employed for generating the read/record beam 16 which is used for reading or recording an encoded signal stored on the information-bearing surface 61 of the optical disc 60. The read/record beam 16 follows a path through a first lens 20, a diffraction grating 25, a beam splitting prism 30, a quarter wave plate 35, a mirror 36, and an objective lens 38 to a point of impingement 37 on the information-bearing surface 61 of the optical disc 60. The read/record beam 16 is reflected at the point of impingement 37 from the information-bearing surface 61 of the optical disc 60 to form the reflected read/record beam 17 which follows a return path through the objective lens 38, the mirror 36, the quarter wave plate 35, the beam splitting prism 30 to a photodetector unit 40. The photodetector unit 40 performs the operation of measuring the intensity of light of the reflected read/record beam 17 and converting this intensity of light into the electrical signals 41a–f which are passed to the control unit 100.

Figure 4:
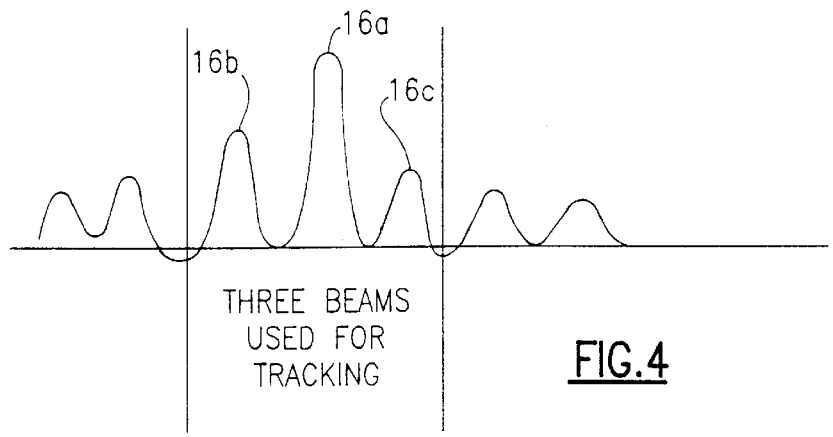
FIG. 4 is a diagram showing three beams of a three-beam tracking system.

Referring to FIG. 2, the operation of the optical system 10 is now described in more detail. FIG. 2 shows the read/record beam 16 generated by the light source 15 first passing through the first lens 20, which is employed for shaping the read/record beam 16. After the read/record beam 16 is properly shaped by the first lens 20, it passes through the diffraction grating 25 which splits the read/record beam 16 into three separate beams 16a, 16b and 16c as shown in FIG. 4.

The side beams 16b and 16c are employed for developing a radial tracking error signal 51 (see FIG. 6) and the center beam 16a is used for developing both a focus error signal 52 (see FIG. 6) and an information signal (not shown). The beams 16a, 16b, 16c are treated identically by the remaining portion of the optical system 10. Therefore, they are collectively referred to as the read/record beam 16.

The output of the diffraction grating 25 is applied to the beam splitting prism 30. The transmitted portion of the read/record beam 16 is applied through the quarter wave plate 35 which provides a forty-five degree shift in polarization of the light forming the read/record beam 16. The read/record beam 16 next impinges upon the mirror 36, which redirects the read/record beam 16 to the objective lens 38. The objective lens 38 is used to shape the read/record beam 16 into a spot of light having a desired size at the point of impingement 37 at which the read/record beam 16 impinges upon the information-bearing surface 61 of the optical disc 60.

Figure 3:
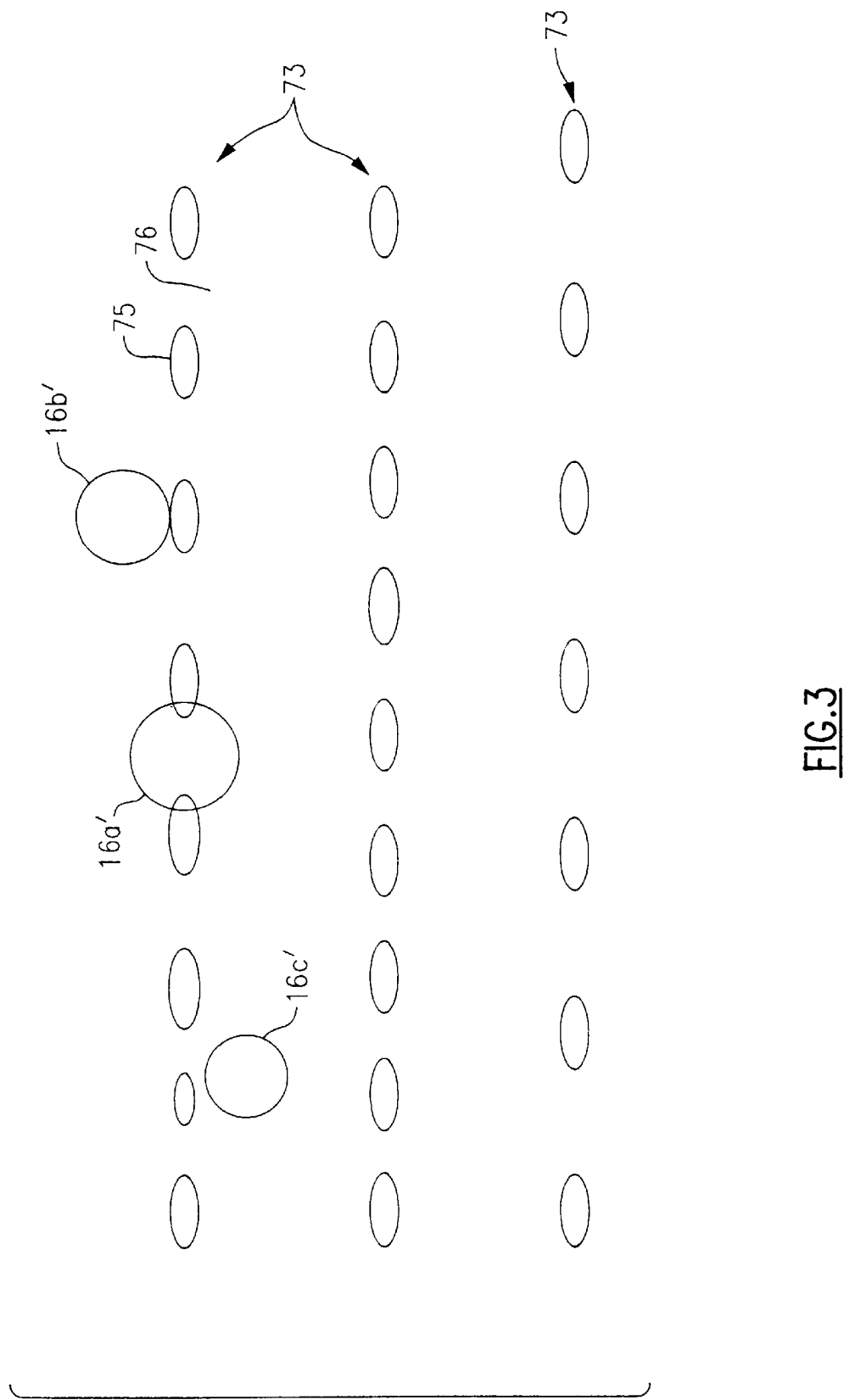
FIG. 3 is a diagram showing tracks of an optical recording medium used in the recording/reproduction apparatus according to the present invention.

Referring to FIG. 3, there is shown an enlarged portion of the information-bearing surface 61 of the optical disc 60. The optical disc 60 includes a plurality of information tracks 73 formed on the information-bearing surface 61 of the optical disc 60. Each of the information tracks 73 comprises a succession of light reflective regions 76 and light non-reflective regions 75. The light reflective regions 76 have generally planar, highly polished surfaces, such as a thin aluminum layer. The light non-reflective regions 75 are generally light scattering surfaces and appear as bumps or elevations above the planar surface representing the light reflective regions 76. The read/record beam 16 has one or more degrees of movement with respect to the information-bearing surface 61 of the optical disc 60, one of which is in the radial direction. The light beam spots 16a', 16b', 16c' are formed by focusing the read/record beams 16a, 16b, 16c onto the tracks 73 of the information-bearing surface 61 of the optical disc 60. The light spots 16a', 16b', 16c' pass over the light reflective regions 76 and the light non-reflective regions 75 of the rapidly rotating the optical disc 60 to form, respectively, the reflected read/record beams 17a, 17b, 17c, collectively referred to as the reflected read/record beam 17. The three light beam spots 16a', 16b', 16c' are positioned on the tracks 73 of the optical disc 60. Data is encoded on the tracks 73 of the optical disc 60 in the form of pits (e.g., 75) and the spaces therebetween 76. If light strikes the spaces 76 between the pits 75 it is reflected back into the objective lens 38. If light strikes the pit 75, it is not reflected.

Referring back to FIG. 2, the reflected light from the point of impingement 37 of the optical disc 60 is gathered by the objective lens 38 to create the reflected read/record beam 17. The reflected read/record beam 17 retraces the same path previously explained by impinging in sequence upon the mirror 36, and the quarterwave plate 35, which provides an additional forty five degree polarization shift resulting in a cumulative total of one hundred eighty degrees in shift of polarization. The reflected read/record beam 17 then impinges upon the beam splitting prism 30 which diverts a portion of the reflected read/record beam 17 to impinge upon the photodetector unit 40.

Figure 5:
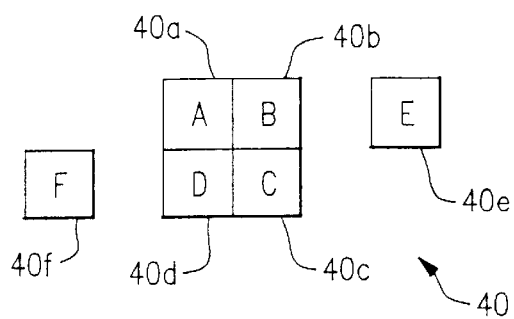
FIG. 5 is a diagram showing a photodetector array employed in a three-beam tracking system.

FIG. 5 shows further elements of the photodetector unit 40. The photodetector unit 40 is configured as a three-spot tracking pickup arrangement comprising four adjacent photodetectors 40a, 40b, 40c, 40d. Diagonally opposite the larger square comprising the four photodetectors 40a–d are the two tracking photodetectors 40e, 40f. The photodetector unit 40 receives the reflected read/record beam 17 comprising the reflected read/record beams 17a, 17b, 17c. The reflected read/record beams 17a, 17b, 17c result from the reflection of read/record beams 16a, 16b, and 16c from the information-bearing surface 61 of the optical disc 60. The reflected beams 17b, 17c impinge upon the tracking photodetectors 40e and 40f. The center beam 17a impinges on the four adjacent photodetectors 40a, 40b, 40c, 40d.

Referring back to FIG. 2, the recording/reproducing apparatus 1 further comprises mechanisms for moving optical components of the optical system 10, including a carriage 65, an actuator coil 68, and an actuator coil 71. The carriage 65 radially moves the optical system 10 across the information-bearing surface 61 of the optical disc 60 in response to the carriage drive signal 66. The actuator coil 68 moves the objective lens 38 in a direction along a focal plane with respect to the optical disc 60 in response to the focus drive signal 69. The actuator coil 71 moves the objective lens 38 in a radial direction across the optical disc 60. The tracking drive signal 72 varies a current flowing through the actuator coil 71 in a manner that effects a motion of the objective lens 38 in the radial inward direction 22a or the radial outward direction 22b for tracking. The above-described mechanisms for moving the optical components will be further described with reference to FIG. 6.

Figure 6:
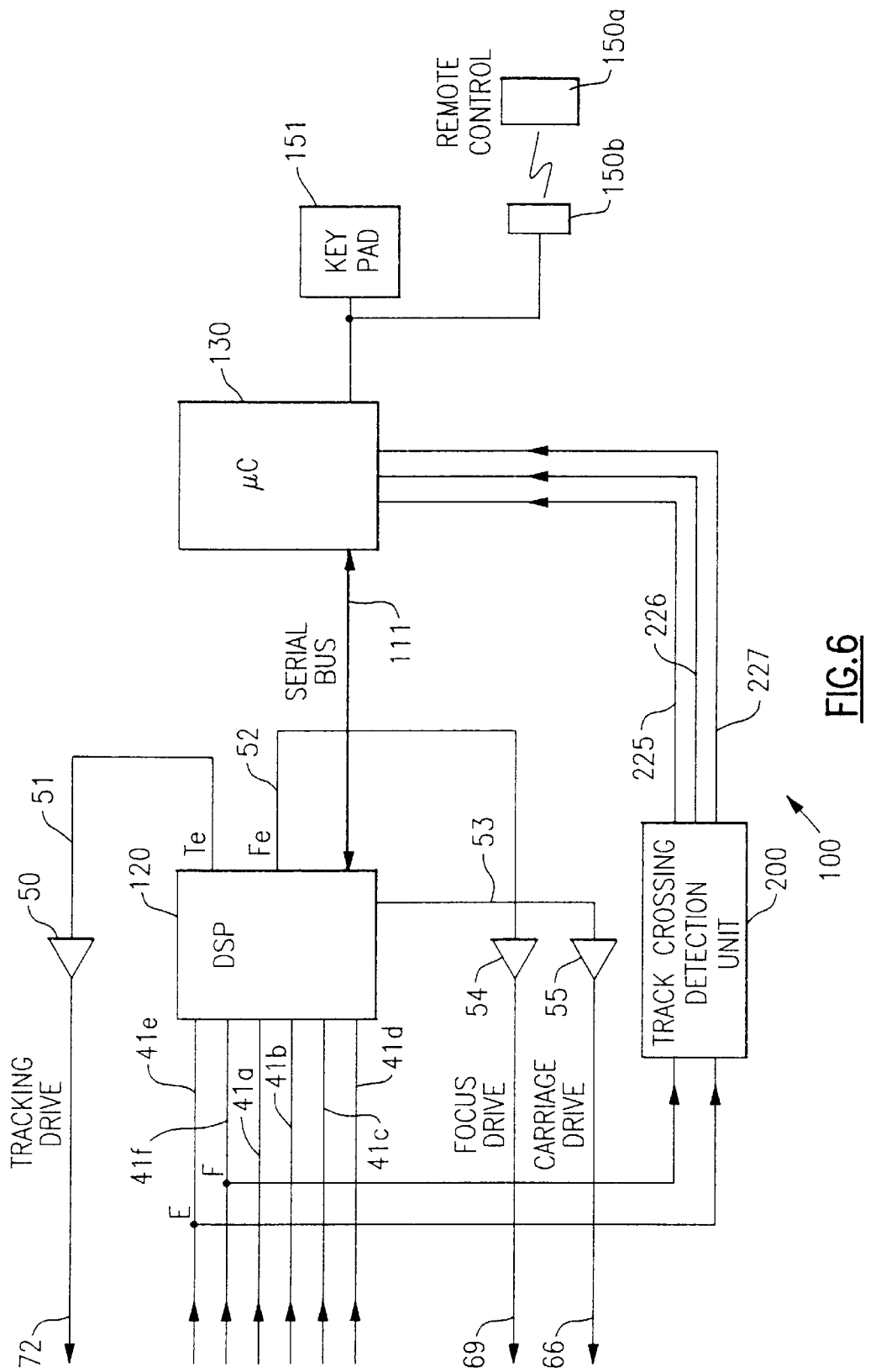
FIG. 6 is a diagram showing circuitry for controlling the read/record beams of the recording/reproduction apparatus according to the present invention.

Referring to FIG. 6, the control unit 100 controls tracking and focusing of the light spots 16a', 16b', 16c' at the point of impingement 37 of the information-bearing surface 61 of the optical disc 60. The control unit 100 comprises a digital signal processor (DSP) 120, a microcomputer 130, a track crossing detection unit 200, a keypad 151 and/or a remote control keypad/transmitter 150a and associated therewith a remote control receiver 150b.

The DSP 120 receives the electrical signals 41a–f from the photodetector elements 40a–f of the photodetector unit 40 which measure the light intensity from the reflected read/record beams 17a–c. The DSP 120 then performs analog processing on the received electrical signals 41a–f to produce output signals for controlling the relation of the read/record beam 16 with respect to the information-bearing surface 61 of the optical disc 60, including a tracking error signal (Te) 51, a focus error signal (Fe) 52, and a carriage signal 53.

The focus error signal 52 is amplified by an amplifier 54 to produce the focus drive signal 69 having sufficient current to drive the actuator coil 68. The DSP 120 forms the focus error signal 52 from the photodetector signals 41a–d. The focus drive signal 69 varies the current flowing through the actuator coil 68 in a manner that effects a motion of the objective lens 38 in a focal direction with respect to the information-bearing surface 61 of the optical disc 60. An apparatus and method for focus control is described in Ceshkovsky (U.S. Pat. No. 5,978,331), incorporated herein by reference.

The tracking error signal 51 is amplified by an amplifier 56 to produce the tracking drive signal 72 having sufficient current to drive the actuator coil 71. The tracking drive signal 72 varies the current flowing through the actuator coil 71 in a manner that effects a motion of the objective lens 38 in a radial inward direction 22a or a radial outward direction 22b for tracking. The tracking error signal 51 is formed by taking the difference between the electrical signals output from the photodetectors 40e and 40f. FIG. 3 illustrates the pair of tracking light spots 16b' and 16c' irradiated so that they form a pair of tracking beams to be disposed symmetrically with the center beam light spot 16a' sandwiched therebetween on a line forming a predetermined angle with respect to the track 73 to which tracking is performed.

The reflected light rays of the pair of tracking beams 17e, 17f from the information-bearing surface 61 of the optical disc 60 are respectively received by the pair of photodetectors 40e and 40f. The difference between the respective electrical signals 41e and 41f output from the photodetectors 40e and 40f is employed as the tracking error signal 51. An apparatus and method for tracking is described in Ceshkovsky (U.S. Pat. No. 5,689,485), incorporated herein by reference.

The carriage signal 53 is amplified by an amplifier 55 to produce the carriage drive signal 66 having sufficient current to direct the carriage drive 65 to move the optical system 10 radially across the information-bearing surface 61 of the optical disc 60.

The microcomputer 130 has resident therein programs for controlling the recording/reproducing apparatus 1, including programs for controlling the tracking error signal 51, the focus error signal 52, and the carriage signal 53. The microcomputer 130 is electrically coupled to the DSP 120 through a serial bus 111 over which information and control signals are transmitted. The microcomputer 130, preferably directed by one of the resident programs, directs the point of impingement 37 of the read/record beam 16 on the information-bearing surface 61 of the optical disc 60 so as to radially track the information carrying indicia located on the tracks 73 on the information-bearing surface 61 of the optical disc 60. The tracking is accomplished by driving the actuator coil 71 to respond to the tracking error signal 51, so that the point of impingement 37 of the read/record beam 16 is directed to a desired position in a radial direction over the information-bearing surface 61 of the optical disc 60.

A user may initiate commands such as "search" or "pause" to the microcomputer 130 by entering the commands on a key pad 151 or, alternately, on the remote control key pad 150a remotely coupled to the remote control receiver 150b. The microcomputer 130 may have resident one or more computer programs to carry out a search for a track of the information-bearing surface 61 of the optical disc 60. The microcomputer 130 receives one or more signals from the track crossing detection unit 200, including an up-count signal 225, a down-count signal 226, and a counter output signal 227. The microcomputer 130 directs the search by controlling the tracking drive signal 72 and/or the carriage drive signal 66 by issuing commands through the serial bus 111.

Figure 7:
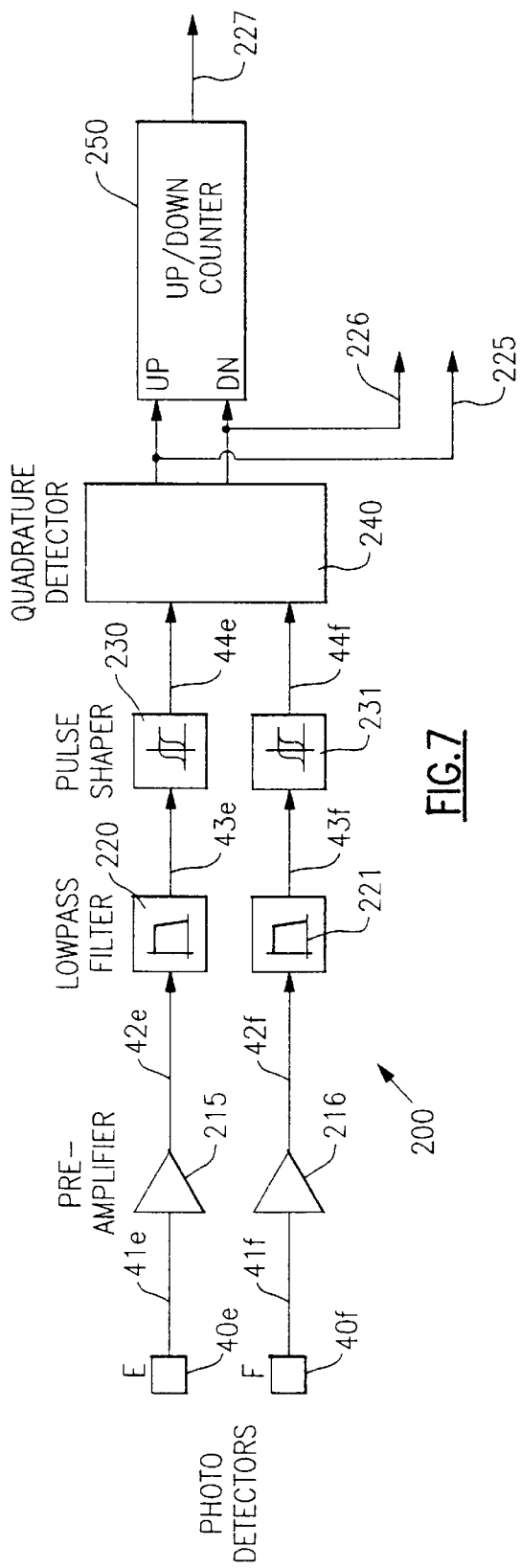
FIG. 7 is a block diagram showing a track crossing detection unit according to the present invention.

FIG. 7 shows the track crossing detection unit 200 comprising the photodetectors 40e, 40f, pre-amplifiers 215, 216, low pass filters 220, 221, pulse shapers 230, 231, a quadrature detector 240, and an up/down counter 250. The track crossing detection unit 200 outputs the up-count signal 225, the down-count signal 226, and the counter output signal 227. The signals 225, 226, 227 are electrically coupled as inputs to the microcomputer 130 shown in FIG. 6. The up/down counter 250 produces the counter output signal 227 representing a numerical value depending on the inputs 225, and 226. A pulse on the up-count signal 225 increments by one the counter output signal 227. A pulse on the down-count signal 226 decrements by one the counter output signal 227.

Figure 9:
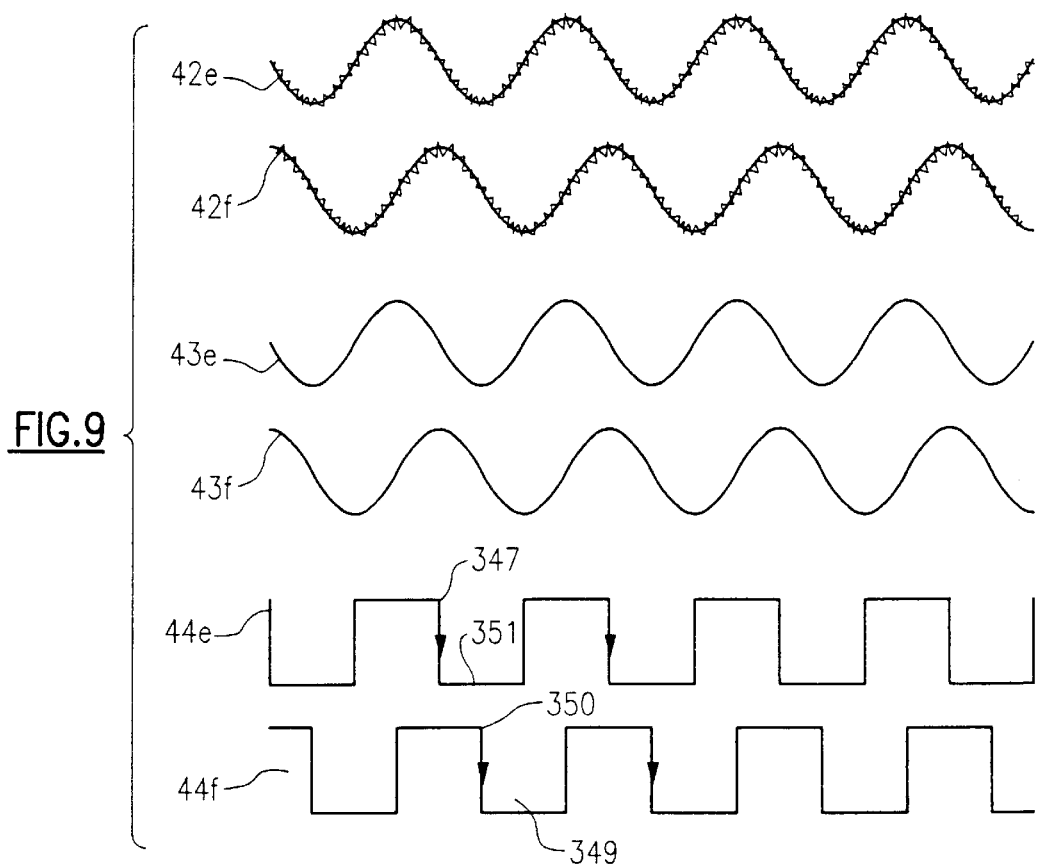
FIG. 9 shows the electrical signals at selected locations of the track crossing detection unit according to the present invention.

Referring to FIG. 7, there is shown the photodetectors 40e and 40f, having received the reflected read/record beams 17e and 17f, respectively, converting the reflected read/record beams 17e and 17f to electrical signals 41e and 41f, respectively. The pre-amplifiers 215, 216 amplify the electrical signals 41e and 41f, respectively, to form, respectively, the amplified electrical signals 42e and 42f. An example of the signals 42e and 42f is depicted in FIG. 9. The signals 42e, 42f are shown having high frequency noise resulting from traversing the tracks of the information-bearing surface 61 of the rapidly rotating the optical disc 60.

During the search mode light beam spots 16a', 16b', and 16c' traverse the information tracks 73 of the information-bearing surface 61 of the optical disc 60 in approximately a radial direction. As light beam spots 16a' and 16c' traverse the disc, the electrical signals 41e and 41f form a sinusoidal like waveform as a result of the differences in reflectance between the areas of the tracks containing information and the areas not containing information. The electrical signals 41e and 41f have been previously adjusted to form a quadrature relationship with each other.

Each of the signals 42e, 42f is passed through the respective low pass filter 220, 221 to remove any high frequency noise to produce filtered electrical signals 43e, 43f as shown in FIG. 9. Each of the filtered signals 43e, 43f passes through one of the respective pulse shaping circuits 230, 231, preferably a Schmitt-trigger, to convert each signal to its respective digital signal 44e, 44f having square pulse shapes as shown in FIG. 9. The pulse shaping circuits 230, 231 may include other pulse shaping means such as an analog comparator. The digital signals 44e, 44f are input to the quadrature detector 240.

The signals 44e, 44f are prepared for reception by the quadrature detector 240 by adjustment of the signals 44e, 44f to form a quadrature relationship an example of which is depicted in FIG. 9. A quadrature relationship is formed by adjustment of the light spots 16b', 16c', or by adjustment of one of the electrical signals, including the smooth signals 42e, 42f, and the digital signals 44e, 44f. The digital signals 44e, 44f are adjusted to form a 90-degree relationship. Additionally, the digital signals 44e, 44f are also adjustable to form an approximately 90-degree relationship as permitted by the tolerance requirements of the quadrature detector 240. In one embodiment, the tracking spots 16b' and 16c' are adjusted by rotating the diffraction grating 25 so that the digital signals 44e and 44f form a quadrature relationship with each other. However, other methods of adjusting the signals 44e and 44f to form a quadrature relationship are not precluded, for example, adjusting the positions of the light source, objective lens, mirror angle, and/or optical and electrical parameters of the recording/reproducing apparatus 1. Additionally, in other embodiments the quadrature relationship may be established with respect to other signal pairs, including the light spot pair 16a', 16b', the signal pair 41e, 41f, the signal pair 42e, 42f, and the signal pair 43e, 43f.

Figure 8:
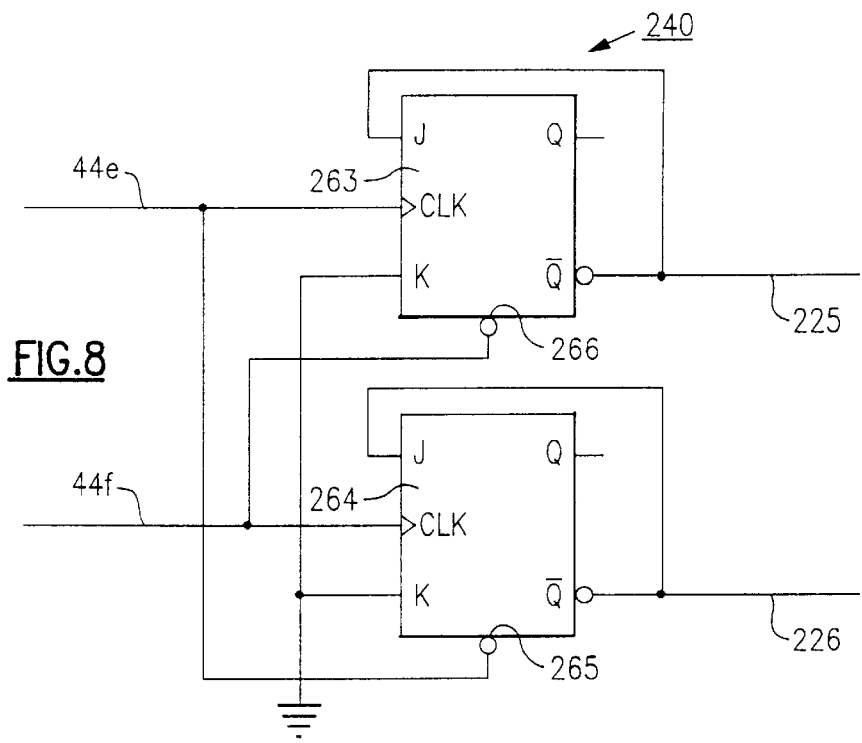
FIG. 8 is a diagram of an embodiment of a quadrature detector.

FIG. 8 shows the quadrature detector 240 comprising a JK flip-flop 263 and a JK flip-flop 264. The JK flip-flop 263, comprising a clock input (CLK), a Q output and a $\overline{Q}$ output, receives the signal 44e in the clock input (CLK) and outputs the signal 225 from the $\overline{Q}$ output. The JK flip-flop 264, comprising a clock input (CLK), a Q output and a $\overline{Q}$ output receives the signal 44f in the clock input (CLK) and outputs the signal 226 from the $\overline{Q}$ output. The $\overline{Q}$ output of the JK flip-flop 263 is connected to a J input of the JK flip-flop 263. The $\overline{Q}$ output of the JK flip-flop 264 is connected to a J input of JK flip-flop 264. The K inputs of the JK flip-flops 263, 264 are connected to each other and to ground. The signal 44e additionally connects to a reset input 265 of the JK flip-flop 264. The signal 44f additionally connects to a reset input 266 of the JK flip-flop 263. The resets 265, 266 reset on the negative transition edges.

In the case when movement of the optical system 10 causes read/record beams 16a, 16b, 16c to radially traversed the tracks of the information-bearing surface 61 of the optical disc 60 in an inward direction 22*a*, i.e., moving from the outer edge of the information-bearing surface 61 of the optical disc 60 to the inner edge of the information-bearing surface 61 of the optical disc 60, light beam spots 16*a*', 16*b*', and 16*c*' radially cross the tracks 73 of the information-bearing surface 61 of the optical disc 60 with the reflected light beam spot 16*b*' preceding the reflected light spot 16*c*'. As a result, as shown in FIG. 9, the electrical signal 42*e* will lead the electrical signal 42*f* as the light beam spot 16*b*' proceeds the light spot 16*c*' by approximately 90 degrees, the signals 44*e* and 44*f* having been previously adjusted to be in a quadrature relationship.

Figure 10A:
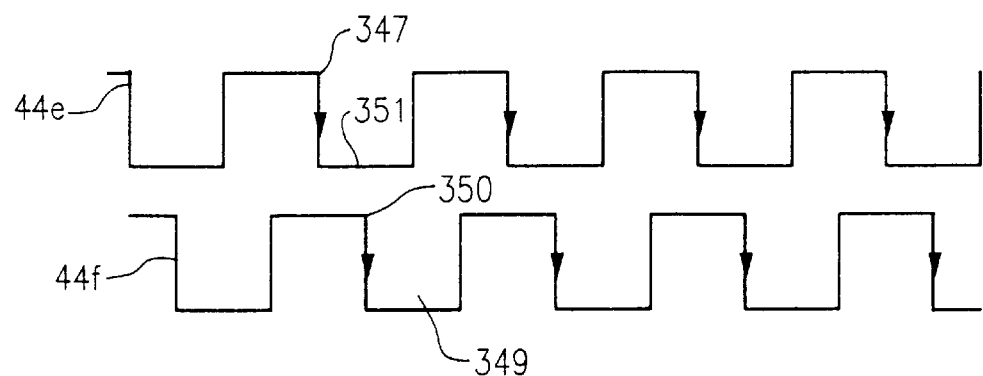
FIG. 10A illustrates the E and F quadrature signals, with the E signal leading the F signal.

As illustrated in FIG. 9 and repeated in FIG. 10A, traversal of the information-bearing surface 61 in the inward direction 22*a* causes the signal 44*e* to lead the signal 44*f*. As a result, a falling edge 347 of the signal 44*e* occurs in time before a falling edge 350 of the signal 44*f*. The falling edge 347 of the signal 44*e* input to the CLK input of the JK flip-flop 263 has the effect of setting the Q output of the upper JK flip-flop 263 high. The JK flip-flop 263 is reset asynchronously by a low level 349 on the signal 44*f*. Thus, the upper JK flip-flop 263 pulsates with every cycle of tracks traversed. The falling edge 350 of the signal 44*f*, which is input to the clock input of the lower JK flip-flop 264 won't set the Q output of the JK flip-flop 264 to a high level because the Q output of the JK flip-flop 264 is held low by a low level 351 of the signal 44*e*, which is fed into the asynchronous reset input 265 of the JK flip-flop 264. Consequently, the Q output of the JK flip-flop 264 always stays low, and the $\overline{Q}$ output 226 always stays high while the light beam spots 16*a*', 16*b*', 16*c*' traverse the tracks 73 of the optical disc 60 in the radially inward direction 22*a*.

Figure 10B:
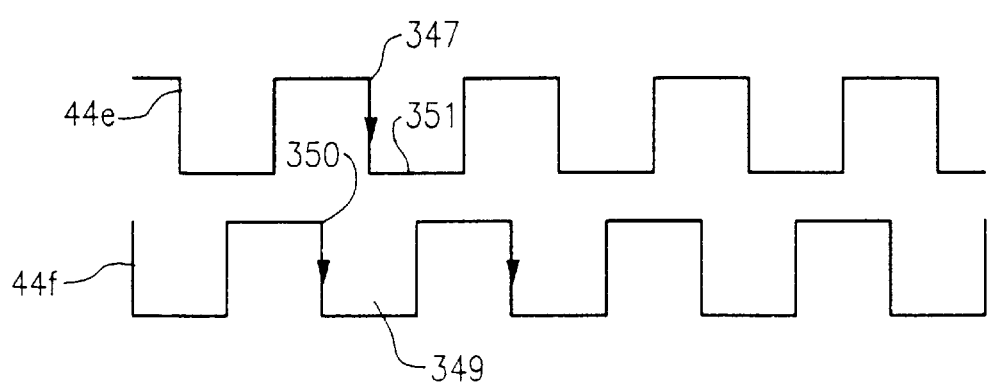
FIG. 10B illustrates the E and F quadrature signals, with the F signal leading the E signal.

In the case when movement of the optical system 10 causes the read/record beams 16*a*, 16*b*, 16*c* to radially traverse the tracks of the optical disc 60 in the radially outward direction 22*b*, the light beam spots 16*a*', 16*b*', and 16*c*' radially cross the tracks 73 on the information-bearing surface 61 of the optical disc 60 with reflected light spot 16*c*' preceding reflected light beam spot 16*b*'. As a result, as shown in FIG. 10B, the signal 44*f* will lead the signal 44*e* in time by approximately 90 degrees, the signals 44*e* and 44*f* having been previously set to be in a quadrature. When the optical disk is traversed in the radially outward direction 22*b*, the signal 44*f* leads the signal 44*e*. Thus, the falling edge 350 of the signal 44*f* has the effect of setting the Q output of the lower JK flip-flop 264 high. Then the JK flip-flop 264 is reset asynchronously by the low level 351 on the signal 44*e*. Thus, the lower JK flip-flop 264 pulsates with every cycle of tracks traversed. The falling edge 347 of the signal 44*e*, which is input to the clock input of the upper JK flip-flop 263, won't set the JK flip-flop 263 high. That is because the JK flip-flop 263 is held low by the low level 349 of the signal 44*f*, which is fed into the asynchronous reset input 266 of the JK flip-flop 263. Consequently, the Q output of the JK flip-flop 263 always stays low and the $\overline{Q}$ output 225 always stays high while light beam spots 16*a*', 16*b*', 16*c*' traverses the tracks 73 of the optical disc 60 in the radially outward direction 22*b*. FIG. 10A showing signal 44*e* leading signal 44*f* and is to be contrasted with FIG. 10B showing signal 44*f* leading signal 44*e*.

Figure 11:
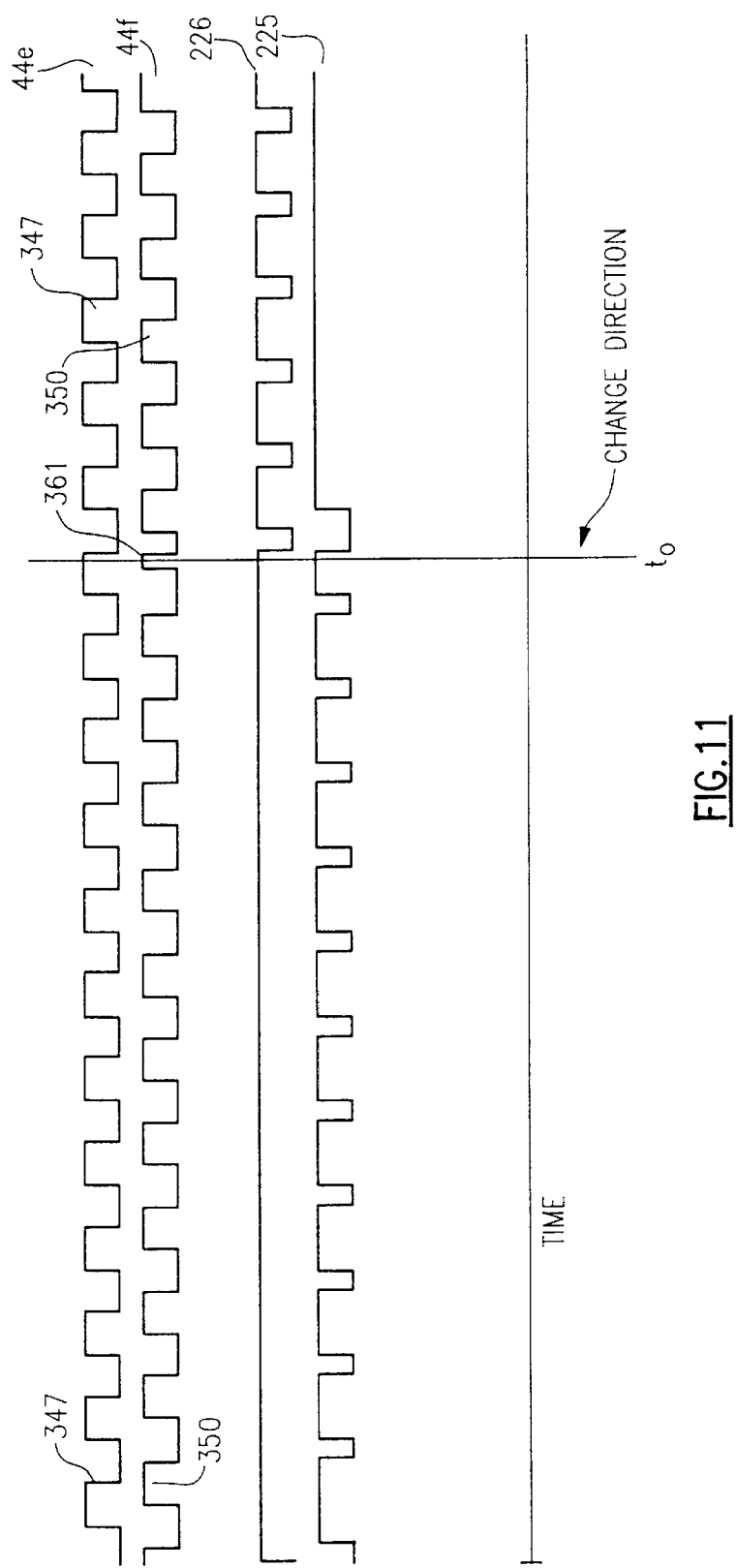
FIG. 11 shows the electrical signals at the input and output of the quadrature detector according to the present invention.

FIG. 11 shows two signals output from the quadrature detector 240, the up-count signal 225 and the down-count signal 226. A pulse on the up-count signal 225 indicates the light spots 16*b*', 16*c*' have traverses a track of the optical disc 60 radially inwardly 22*a*. A pulse on the down-count signal 226 indicates the light spots have traversed a track of the optical disc 60 in the radially outward direction 22*b*.

The up-count signal 225 and the down-count signal 226 are connected to the up/down counter 250 that counts in an incremental way the number of tracks traversed. The up/down counter 250 receives the first signal 225 indicating the up-count and the second signal 226 indicating the down-count. A pulse on the first signal 225 causes the up/down counter 250 to increment an accumulated total by one. A pulse of the second signal 226 causes the up/down counter 250 to decrement the accumulated total by one. The up/down counter 250 is of sufficient size to store the maximum number of tracks to be traversed during the search. Alternately, the up-count signal 225 and the down-count signal 226 may be connected directly to the microcomputer 130. This requires the use of interrupt inputs of a very fast microcomputer.

The first part (0<t<to, where t is time) of FIG. 11 shows the outputs 225,226 of the quadrature detector 240 caused by the inputs 44*e*,44*f* in the case where the search direction is in the radially inward direction 22*a* so that the signal 44*e* leads the signal 44*f* by about 90 degrees. As a result, the signal 225 pulsates for each track traversal while the signal 226 remains high. In the second part (t>to) of FIG. 11, the search direction being reversed to the radially outward direction 22*b* causes a phase change observable by a pulse 361 of signal 44*f* being of shorter duration than the other pulses. The signal 44*f* now leads the signal 44*e* by about 90 degrees. As a result, the signal 226 pulsates for each track traversal while the signal 225 remains high.

The present invention has the advantage of improving the accuracy of a high-speed search even in the situation where acceleration forces are applied to the optical pickup during the high-speed search. Because either an up-pulse or a down-pulse is produced for each track traversed, the optical pickup may move several times back and forth between the initial track and the target track of the search and the correct number of tracks traversed will still be counted. This is not true of a device that forms a count estimate from an integrated average of tracks traversed during a predetermined time period.

Figure 13:
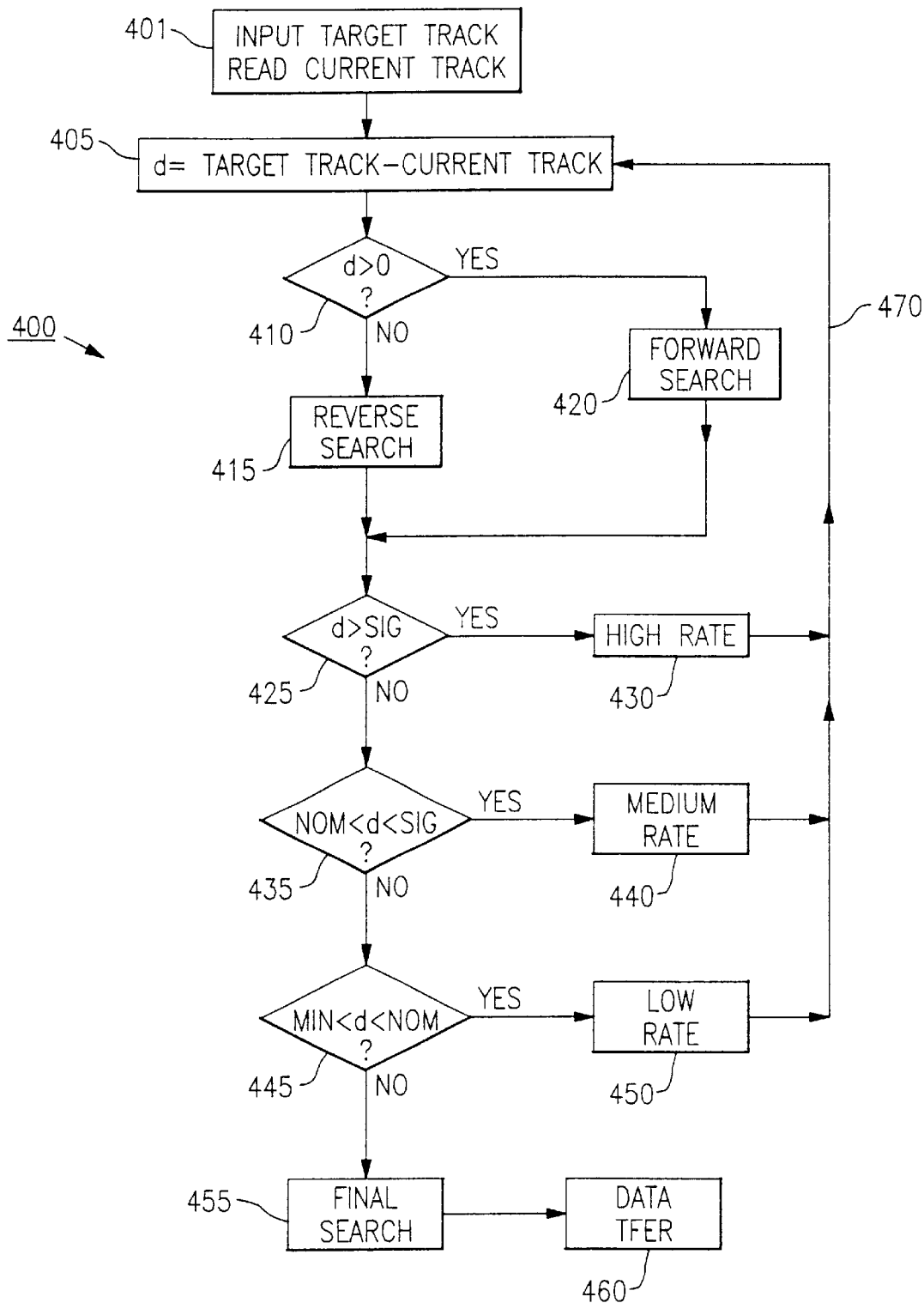
FIG. 13 is a flow diagram of a method of searching according to the present invention.

FIG. 13 shows a method of search 400 typically directed by a program resident in the microcomputer 130. The microcomputer 130 is configurable to receive the count signal 227 from the up/down counter 250 or, alternately, the up-count signal 225 and the down-count signal 226 directly from the quadrature detector 240.

At step 401, the search begins by determining the target track and the current track. The target track is input by a user via keypads 151, 150*a* or otherwise determined by a program of the microcomputer 130. The current track is initially determinable, for example, by reading a track address imprinted on the current track.

At step 405, the difference (d) is determined by subtracting the current track location from the target track location. At step 410 if it is decided that the target track location is greater than the current track location (d>0), a forward search is initiated at step 420, or, conversely if the target track location is less than the current track location (d<0), a reverse search is initiated at step 415.

Figure 12:
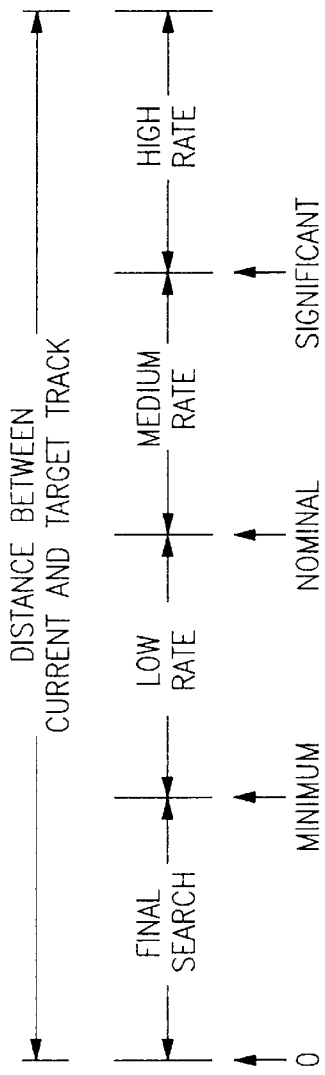
FIG. 12 illustrates the main variables of a multi-rate search according to the present invention.

As illustrated in FIG. 12, one of three rates of movement of the optical system 10 is initiated based on the relationship of the distance between the current and target track. The rates of movement of the carriage 65 are denoted high, medium, and low wherein low<medium<high. The following distance values are pre-determined: minimal (min), nominal (nom), and significant (sig), wherein min<nom<sig, as illustrated in FIG. 12. The high rate of movement is initiated if the difference in distance between the current track and the target track is more than the significant distance (i.e., d>sig). The medium rate of movement is initiated if the difference between the current track and the target track is less than the significant distance but greater than the nominal distance (i.e., nom<d<sig). The low rate of movement is initiated if the difference between the current track and the target track is greater than a minimum distance but less than the nominal distance (i.e., min<d<nom). The final search is conducted when the difference is less than the minimum distance (i.e., d<min). The three parameters, i.e., min, nom, sig, and the three velocity parameters, i.e. low rate, medium rate, high rate, are chosen based on the characteristics of the optical system 10, such as the mass of the carriage 65 and the acceleration force applied on the carriage 65.

It is decided at step 425 whether d>sig. If d>sig, then in step 430 the microcomputer 130 sends a first signal to the DSP 120 to disable the track drive signal 72 and sends a second signal to the DSP 120 to activate the carriage 65 to move the optical system 10 at a high speed in a forward or reverse direction as was decided at step 410. Consequently, the carriage 65 is moved at the high speed in an open-loop mode until a first pre-determined number of tracks have been counted using the up/down counter 250 to determine the track crossing count. The optical system 10 then completes its movement. In step 425, if d<sig, then the method proceeds to step 435.

It is decided at step 435 if the distance between the current track and the target track is more than the nominal but less than a significant distance (nom<d<sig). If nom<d<sig, then in step 440 the microcomputer 130 send a first signal to the DSP 120 to disable the track drive signal 72 and a second signal to the DSP 120 to activate the carriage 65 to move the optical system 10 at the medium speed in a forward or reverse direction as was decided at step 410. Consequently, the carriage 65 is moved at the medium speed in an open-loop mode until a second pre-determined number of tracks have been counted using the up/down counter 250 to determine the track crossing count. The optical system 10 then completes its movement. In step 435, if d<nominal, then the method proceeds to step 445.

It is decided at step 445, if the difference between the current track and the target track is more than a minimal distance but less than a nominal distance (i.e., min<d<nom). If min<d<nom, then at step 450 the microcomputer 130 sends a first signal to the DSP 120 to disable the track drive signal 72 and a second signal to activate the carriage 65 to move the optical system 10 at a the low speed in a forward or reverse direction as was decided at step 410. Consequently, the carriage 65 is moved at the low speed in an open-loop mode until a third pre-determined number of tracks have been counted using the up/down counter 250 to determine track crossing count.

After any on of the above search movements 430, 440, 450 has been completed the current track location is re-computed by the microcomputer 130 and compared to the target track to determine if further movement is necessary at step 470 to move the optical system 10 over the target track as described above.

In step 445, if d<minimal, then the method proceeds to step 455. The final search mode at step 455 is the most fine grade search. The final search mode is initiated if the difference between the current track and the target track is less than the minimal distance. The final search is conducted in closed-loop mode and characterized by a series of individual track movements in the direction necessary to reach the target track. To initiate the final search, the microcomputer 130 sends a signal to the DSP 120 to enable the track drive signal 72. In the event that after final search the target location is not located for any reason the target track is incremented by a predetermined amount and the final search mode is re-initiated. At the end of this search, the correct track is located and the microcomputer initiates a transfer of data at step 460 by reading the data located on the identified track. The effectiveness of the high-speed search method described herein is enhanced by the accurate track counting of the present invention.

In another embodiment of the present invention, the search method 400 is generalized to operate with one or more rates of motion (other than 3 as has been described). A plurality of disjoint intervals are defined similar to what was done in the search method 400 wherein four intervals were defined (see FIG. 12). Each interval defines an operating range for a rate of motion. The optical system 10 moves at one of the rates of motion if the distance falls within the corresponding interval. The number of tracks crossed is counted to determine the current track, based on the up-count signal 225 and the down-count signal 226, while the optical system 10 is moving according to one of the above moving steps.

The present invention is not to be limited in scope by the specific embodiments described herein. Indeed, this application is intended to cover any modifications of the present invention, in addition to those described herein, and the present invention is not confined to the details which have been set forth. Thus, the scope of the invention should be determined by the appended claims and their legal equivalents, rather than by the examples given.

What is claimed is:

1. An apparatus for conducting a high speed search on an optical medium having a plurality of tracks on which information is recorded, at least a first light spot and a second light spot being directed by an optical system onto the optical medium, the light spots traversing across the tracks in one of a first direction and a second direction, comprising:

a photodetector unit configured to receive a reflected component of the first light spot to form a first electrical signal and a reflected component of the second light spot to form a second electrical signal;

digital shaping circuitry configured to respectively convert the first electrical signal and the second electrical signal into a first digital signal and a second digital signal; and a quadrature detector configured to receive the first digital signal and the second digital signal to produce from the first digital signal and the second digital signal an up-count signal indicating that the light spots are traversing the tracks in the first direction and a down-count signal indicating that the light spots are traversing the tracks in the second direction.

2. The apparatus of claim 1, further comprising:

a counter configured to count, during the search, the up-count signal and the down-count signal to determine a number of tracks traversed by the light spots.

3. The apparatus of claim 1, further comprising:

a microcomputer coupled to the quadrature detector and configured to count, during the search, the up-count signal and the down-count signal to identify a number of tracks traversed by the light spots.

4. The apparatus of claim 1, wherein:

the first light spot and the second light spot are arranged on the tracks in a quadrature relationship to each other.

5. The apparatus of claim 1, wherein:

the first electrical signal and the second electrical signal are arranged on the tracks in a quadrature relationship to each other.

6. The apparatus of claim 1, wherein:

the first digital signal and the second digital signal are arranged in a quadrature relationship to each other.

7. The apparatus of claim 6, wherein:

the quadrature relationship is characterized by about a 90-degree shift between the first digital signal and the second digital signal.

8. The apparatus of claim 6, wherein:

the quadrature relationship is characterized by a tolerance relationship between the first digital signal and the second digital signal, the tolerance relationship being determined so that the first digital signal and the second digital signal vary within a specified number of degrees of 90 degrees as permitted by a tolerance parameter of the quadrature detector.

9. The apparatus of claim 6, wherein:

the quadrature relationship is characterized by the first digital signal leading the second digital signal in time.

10. The apparatus of claim 6, wherein:

the quadrature relationship is characterized by the second digital signal leading the first digital signal in time.

11. The apparatus of claims 4, 5, or 6, wherein:

the optical system further comprising:
  a light source creating a light beam; and
  a diffraction grating splitting the light beam into at least at least a first light beam and a second light beam causing, respectively, the first light spot and the second light spot.

12. The apparatus of claim 11, wherein:

the quadrature relationship is produced by adjusting the diffraction grating.

13. The apparatus of claim 1, wherein:

the photodetector unit forms a three-beam system comprising a first photodetector receiving the first light spot and a second photodetector receiving the second light spot.

14. The apparatus of claim 1, wherein:

the photodetector unit forms a three-beam system and a first photodetector receives the first electrical signal being an E signal of the three-beam system and a second photodetector receives the second electrical signal being an F signal of the three-beam system.

15. The apparatus of claim 1, further comprising:

a carriage for moving a portion of the optical system across the optical medium.

16. The apparatus of claim 15, wherein:

the carriage moves the optical system using one or more rates of motion, each of the one or more rates of motion being determined to operate within an interval defining a distance between the tracks of the optical medium, a first distance being computed to be a difference between a current track over which the optical system is presently positioned and a target track, the current track being determined from the up-count signal and the down-count signal, the optical system being moved at the rate of motion corresponding to the interval in which the first distance falls.

17. The apparatus of claim 1, wherein:

the quadrature detector further comprises:
  a first flip-flop having a clock input and a Q output, the first digital signal being coupled to the clock input of the first flip-flop, the up-count signal being coupled to the Q output of the first flip-flop; and
  a second flip-flop having a clock input and a Q output, the second digital signal being coupled to the clock input of the second flip-flop, the up-count signal being coupled to the Q output of the second flip-flop.

18. The apparatus of claim 1, wherein:

the digital shaping circuitry comprises a first Schmitt-trigger converting the first electrical signal into the first digital signal and a second Schmitt-trigger converting the second electrical signal into the second digital signal.

19. The apparatus of claim 1, wherein:

the digital shaping circuitry comprises a first analog comparator converting the first electrical signal into the first digital signal and a second analog comparator converting the second electrical signal into the second digital signal.

20. The apparatus of claim 1, wherein:

the optical system comprises an objective lens for directing the first light spot and the second light spot onto the optical medium.

21. A method for conducting a high speed search, comprising the steps of:

adjusting at least a first light spot and a second light spot to form a quadrature relationship to each other;
directing the first and second light spots onto an optical medium, the light spots traversing across tracks of the optical medium in one of an inward direction and an outward direction;
receiving a reflected component of the first light spot to form a first electrical signal and a reflected component of the second light spot to form a second electrical signal;
shaping the first electrical signal and the second electrical signal into a first digital signal and a second digital signal; and
determining from the quadrature relationship of the first digital signal and the second digital signal an up-count signal indicating that the light spots are traversing the tracks in the first direction and a down-count signal indicating that the light spots are traversing the tracks in the second direction.

22. The method of claim 21, further comprising the step of:

counting the up-count signal and the down-count signal to estimate a number of tracks traversed by the light spots.

23. The method of claim 22, wherein:

a counter having sufficient memory to record a maximum number of tracks traversed receives the up-count signal and the down-count signals and generates the estimate of the number of tracks traversed.

24. The method of claim 22, wherein:

a microcomputer receives the up-count signal and the down-count signals and generates the estimate of the number of tracks traversed.

25. The method of claim 22, further comprising the step of:

moving the first light spot and the second light spot at one of three rates of movement; and
selecting one of the three rates of movement based on a distance between a current track and a target track wherein the current track is estimated by the counting step.

26. The method of claim 22, further comprising the steps of:

determining a distance between a current track over which an optical system is presently positioned and a target track, the optical system configured to position the first and the second light spots on the optical medium;

moving the optical system at a high rate of movement if the distance is greater than a significant distance;

moving the optical system at a medium rate of movement if the distance is greater than a nominal distance but less than the significant distance, the medium rate of movement being less than the high rate of movement, the nominal distance being less than the significant distance;

moving the optical system at a low rate of movement if the distance is less than the nominal distance but greater than a minimal distance, the low rate of movement being less than the medium rate of movement, the minimal distance being less than the nominal distance; and counting, based on the up-count signal and the down-count signal, while the optical system is moving according to one of the above moving steps, the number of tracks crossed to determine the current track.

27. The method of claim 22, further comprising the steps of:

determining a distance between a current track over which an optical system is presently positioned and a target track, the optical system configured to position the first and the second light spots on the optical medium;

determining a plurality of rates of motion for moving the optical system;

determining a plurality of disjoint intervals defining a number of tracks to be crossed, each one of the plurality of rates of motion corresponding to one of the disjoint intervals;

moving the optical system at one of the rates of motion if the distance falls within the corresponding interval; and counting, based on the up-count signal and the down-count signal, while the optical system is moving according to one of the above moving steps, the number of tracks crossed to determine the current track.

28. A method for conducting a high-speed search, comprising the steps of:

determining a target track over which an optical system is to be positioned 1;

measuring a current track over which the optical system is currently positioned;

determining a distance (d) between the target track and the current track;

moving in an open loop mode the optical system at one of a plurality of rates of motion until the optical system rests, to each one of the plurality of rates of motion there being assigned one interval from a plurality of disjoint intervals, wherein if d falls within one of the disjoint intervals the optical system is moved the corresponding rate of motion;

measuring the current track using the apparatus of claim 1 to recalculate d;

repeating the moving step until d is sufficiently small; and moving, once d is sufficiently small, the optical head one track at a time in a closed loop mode until the target track is reached.

\* \* \* \* \*